Patented Dec. 16, 1930

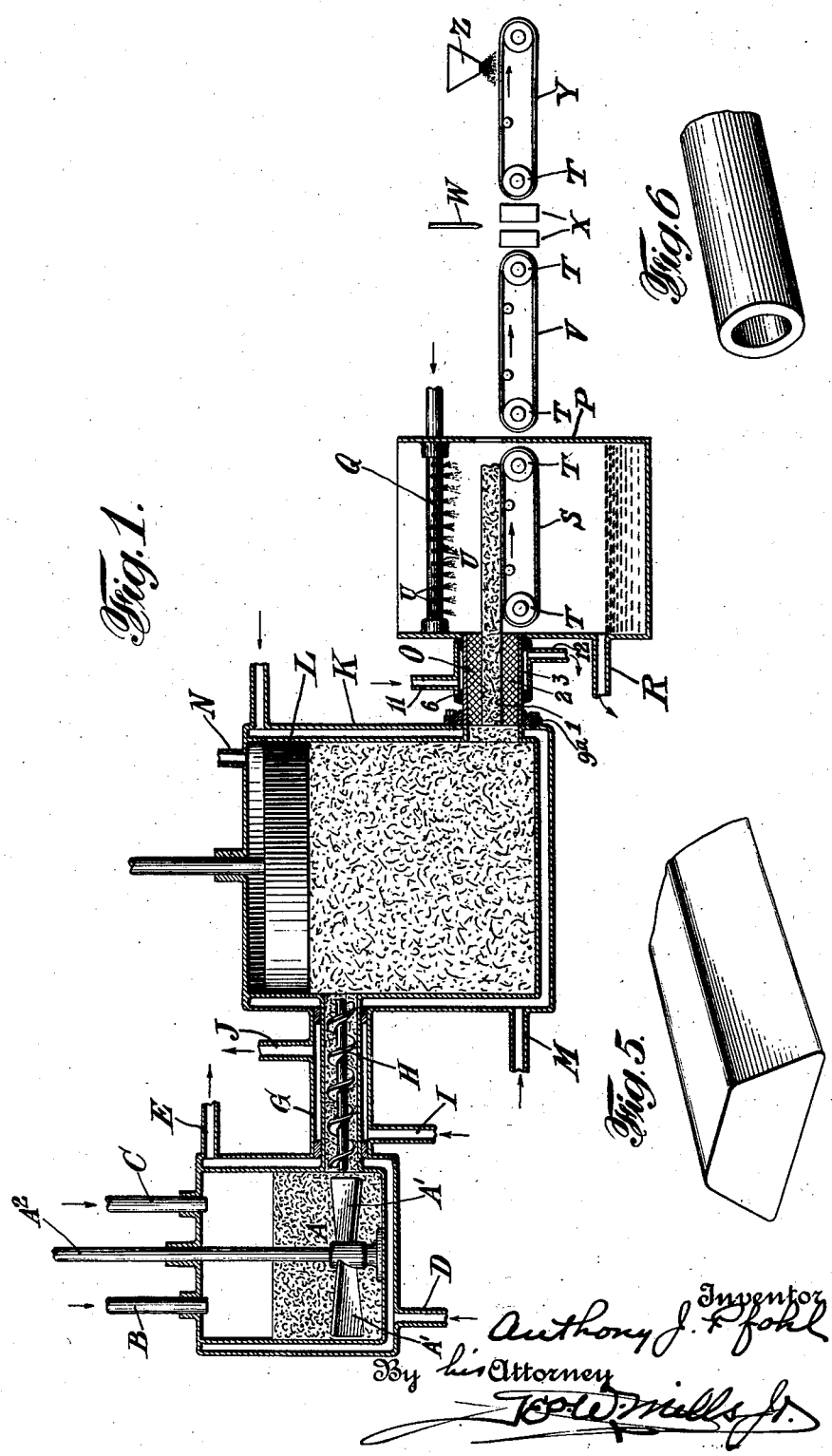

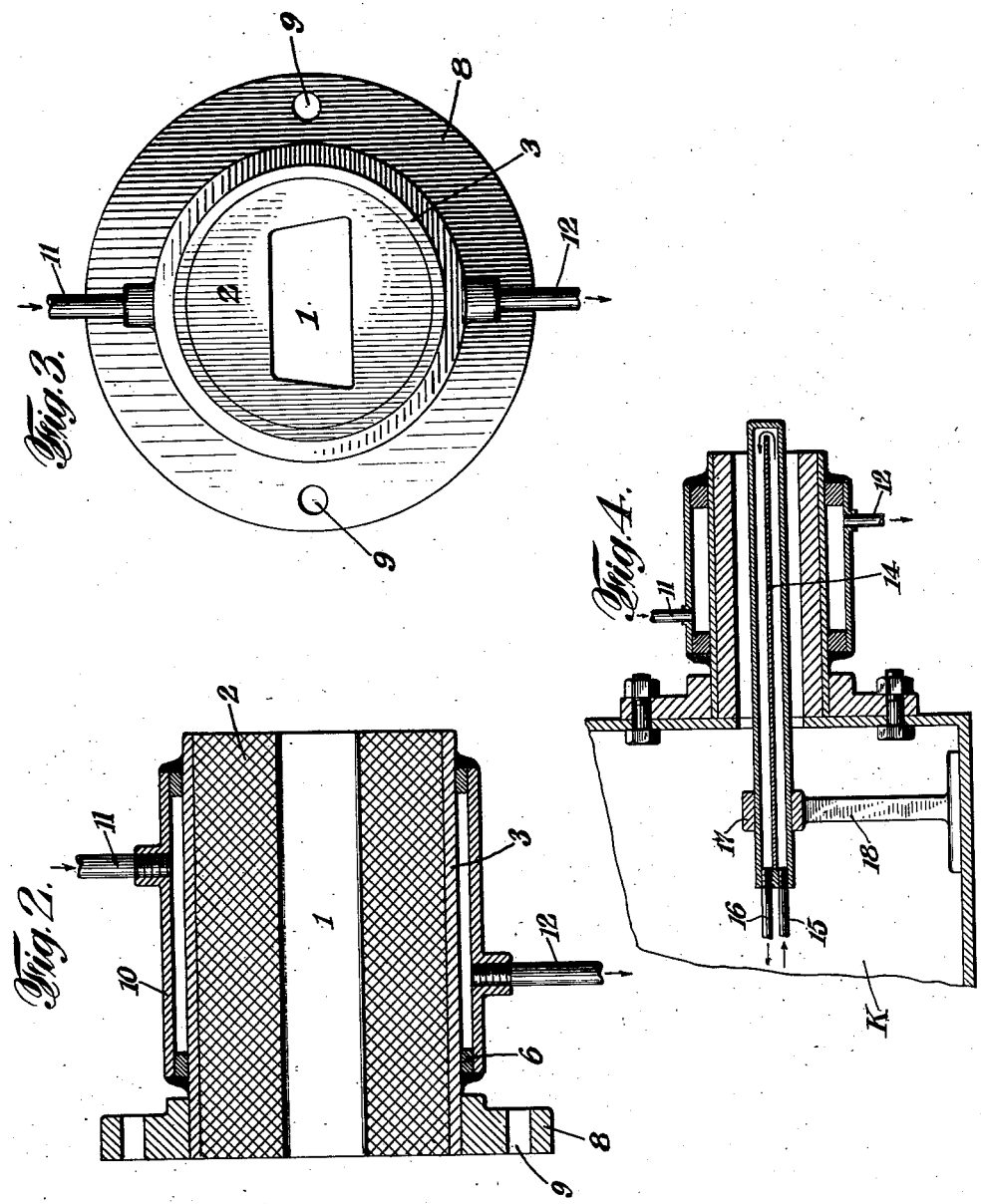

1,785,457

UNITED STATES PATENT OFFICE

ANTHONY J. PFOHL, OF LOCKLAND, OHIO  REISSUED

APPARATUS FOR MOLDING BITUMINOUS MATERIALS

Application filed June 25, 1925. Serial No. 39,619.

My invention relates to apparatus for forming or molding plastic materials. It is especially adapted to the molding of plastic materials into either solid or hollow products, and to the molding of said materials at a very low cost. It is also addressed to providing means whereby the shape into which the material is to be molded can be readily and at very little expense changed. It is adapted to the continuous formation of plastic materials into sections of indefinite length adapted to be cut to any length desired. My invention is especially adapted to the molding or formation of bituminous products or products formed from bituminous and other materials such as expansion joint, rail fillers, paving block, conduits, shingles or any other similar products.

In the drawings in which like characters represent like parts,

Fig. 1 is a diagrammatic view of my apparatus.

Figs. 2 and 3 are detail views of my extrusion die.

Fig. 4 is a modification of my extrusion die.

Fig. 5 is an enlarged fragmentary perspective view of one form of article or product made by the apparatus, and Fig. 6 is a fragmentary perspective view of another form of article or product which may be made by the apparatus.

In the drawings A is a mixing or macerating tank provided with any suitable mixing and, if desired, cutting or chopping means. I have shown mixing paddles A' mounted on a spindle A² which may be rotated by any suitable power. This mixing tank is steam jacketed so as to maintain the contents at the desired temperature while being mixed. Suitable steam intake pipe D and steam outlet pipes E for the steam jacket are provided. The mixing tank is provided with intake parts B and C for the materials from which product is to be made.

An outlet from the mixing tank A is provided in the form of a steam jacketed pipe G which is provided with suitable intake pipe I and an outlet part J for the steam. Within this steam jacketed pipe G is a screw conveyor H which may be operated in any well known manner by any suitable power. At the opposite or outlet end of the conveyor H is a large steam jacketed tank K which contains a plunger L which when not being operated is preferably held above the inlet to the tank K from the conveyor H. This plunger is hydraulically or otherwise operated in any well known manner to force the plastic mass out from the tank K through the passage 1 under pressure. This passage 1 is of any desired form depending upon the form desired for the final product. The passage 1 is formed in any suitable metal, preferably Babbitt metal removably fixed within a steel pipe. As shown in the drawing the passage 1 is in the form of one of the many forms of rail fillers. In the formation of the passage I first make a form of the product desired and melting the metal pour it around the form. When it is cold I remove the core and have the passage of the desired form. Babbitt metal is very satisfactory for the purpose. The extrusion die 2 containing passage 1 as stated is removably fixed within the steel cylinder or pipe 3 having a flange 8 which is provided with holes 9 through which pass bolts 9ª attaching same to the tank K as shown in Fig. 1. Surrounding the cylinder or pipe 3 is another cylinder or pipe 10 of greater diameter. This cylinder is held in place by the filler rings 6—6, one at each end. The ends of the cylinder 10 are welded to the cylinder or pipe 3 so as to seal the space between the two cylinders and form a steam jacket surrounding the die 2 containing the passage 1. Suitable steam inlet 11 and outlet 12 are provided and steam from any suitable source may be passed into the jacket. In this way the die 2 containing the passage 1 may be kept at the desired temperature to permit the bituminous or other plastic mass to be forced through it from the tank K and give it the desired form. While I have shown a plunger L to force the plastic material through the passage 1, if desired any suitable means could be used. If desired a screw conveyor, such as H, could be used to force same through the passage 1 from the mixing tank or from a storage tank. It will be seen from the foregoing that means are provided for keeping the bituminous plastic material or batch containing bituminous material in a heated condition to retain its plasticity so as to permit its being worked. Adjacent to the outlet end of the passage 1 is located cooling means for cooling the product as it is extended from the passage 1, so that it will retain its form. As shown the outlet end of the passage 1 discharges the product on to an endless conveyor S supported on rotating rollers T, T, within a tank P. Located above the conveyor is a pipe or coil of pipes Q having openings or outlets U. This pipe Q conveys, from any suitable supply cold water which through the openings U is sprayed on the extruded product as it is being conveyed, on the conveyor S, through the cooling tank. This cooling of the product as it is being extruded from the passage 1 causes it to retain its form. A conveyor V is arranged to take the product from the cooling tank P. This conveyor is mounted upon and operated by rotating rolls T T and conveys the product to a table or stand X above which is located a saw W or other cutting tool for cutting the product to the desired length. Another conveyor Y mounted upon and operated by rotating rolls T, T is arranged to carry the product to any suitable storage or shipping point. I have provided a hopper Z for any suitable powdered or pulverant material such as soapstone, mica, sand or similar material above the conveyor Y so that if it is desired to surface the product with a non-adhesive surface it can be dropped on it from the hopper as it passes under it on the conveyor Y. The apparatus described is especially adapted for carrying out my process of making bituminous products containing either all bituminous material or bituminous material and a filler of any desired materials such as mineral particles, fibrous materials, etc. This process is disclosed and claimed in my application Serial No. 432,199 filed February 28, 1930, which is a division of this application. As shown the apparatus is arranged to make rail filler and I will describe the process of such manufacture using as the materials for forming the product, asphalt and a filler of fibrous and mineral material such as roofing felt, and small particles of mineral such as crushed slate. Such filler material is readily obtained as the waste or by product resulting from the manufacture of prepared roofing either plain or mineral surfaced. This waste product will also have a quantity of bitumen in it. Into the tank A is put this waste product containing roofing felt, mineral granules and asphalt, if the roofing was an asphalt prepared roofing, a sufficient quantity of asphalt is added to form the desired proportions. In the heated tank the materials are kneaded and thoroughly mixed and a plastic mass formed therefrom. The asphalt is reduced to a plastic state and the fibrous and mineral particles thoroughly distributed through the plastic mass by the kneading and mixing in this tank. Having produced the plastic mass and while retaining it in that condition of plasticity I pass it through an extrusion die having an orifice of the desired shape, under pressure which causes it to completely fill the orifice and to assume, and retain as it is extruded therefrom, the shape of the orifice. Care must be taken that the plastic mass is not heated to a condition when it will be fluid or flow readily. This can readily be determined by those skilled in the art of using such material and will depend upon the asphalt or other bitumen being used. As the mass in its desired form is extruded I immediately cool same so as to prevent deformation and then cut it to the desired length. If it is to be surfaced with a non-adhesive surfacing this is applied either after or before the cutting. Where it is desired to produce a product having a cored or hollow center such as conduits, some forms of rail filler, etc., I form a metal core 13 which is of the form desired. In Fig. 4, I have shown the die of Figs. 2 and 3 provided with a core conforming to the die. In some cases it may be advisable to heat this core and for that purpose I have divided it by a baffle 14 through the center so that steam entering the inlet 15 passes through the core on one side of this baffle and returns to the outlet 16 on opposite side. This core is held in position within the mold by collar 17 supported on brackets 18 within the tank K and by supports in the wall of the tank, or any other suitable manner that will not interfere with the passage of the mix through the passage 1 formed within the extrusion die 2 around the core 13.

Claims:

1. An extrusion mold consisting of a removable member formed of Babbitt metal, a support having an orifice, the removable member providing walls for an extrusion orifice, and means for heating said member.

2. An apparatus for forming an article of a mixture of bitumen and fibrous material, comprising a container for said material, means for reducing the fibrous material to the desired size and for mixing same with the bitumen, means for heating the mixture in said container, an extrusion die having a removable inner wall member formed of a metal of the character of Babbitt metal, and means for passing the material through said extrusion die.

3. An extrusion mold consisting of a steam jacketed support, a member within said support having an orifice with walls formed of smooth cast material and a core within said orifice.

4. An extrusion mold having an orifice with a continuous seamless wall of smooth metal fusible at a comparatively low temperature.

5. An extrusion mold with an orifice having a continuous seamless wall of Babbitt metal.

6. An extrusion mold for molding bituminous material by extrusion, having an orifice with continuous walls of a metal having a low degree of adhesiveness with bitumen.

7. In an apparatus for forming bituminous material into objects of a given shape of cross-section by extrusion, a container having an outlet orifice, means for heating the container, means for forcing the material into the heated container, a die supporting member removably attached to said container over the orifice, and an extrusion die having an inner wall member of a metal of the character of Babbitt metal.

8. In an apparatus for forming bituminous material into objects of a given cross-section by extrusion, an extrusion die having a main body of relatively hard strong metal and a removable inner wall member of a readily cast metal of low fusing temperature.

9. An extrusion die comprising a supporting member, a removable contour-forming member formed of a readily cast metal of the character of Babbitt metal, and means for heating the support.

In testimony whereof, I have signed my name to this specification.

ANTHONY J. PFOHL.